(12) United States Patent
Nagata et al.

(10) Patent No.: US 12,365,958 B2
(45) Date of Patent: Jul. 22, 2025

(54) ELECTRIC RESISTANCE-WELDED STEEL TUBE FOR HOLLOW STABILIZER, HOLLOW STABILIZER, AND MANUFACTURING METHODS OF SAME

(71) Applicants: NIPPON STEEL CORPORATION, Tokyo (JP); NHK SPRING CO., LTD., Yokohama (JP)

(72) Inventors: Yukinobu Nagata, Tokyo (JP); Yuki Motegi, Tokyo (JP); Yuji Araoka, Yokohama (JP); Ken Ou, Yokohama (JP)

(73) Assignees: NIPPON STEEL CORPORATION, Tokyo (JP); NHK SPRING CO., LTD., Yokohama (JP)

( * ) Notice: Subject to any disclaimer, the term of this patent is extended or adjusted under 35 U.S.C. 154(b) by 986 days.

(21) Appl. No.: 17/593,103

(22) PCT Filed: Mar. 27, 2020

(86) PCT No.: PCT/JP2020/014287
§ 371 (c)(1),
(2) Date: Sep. 9, 2021

(87) PCT Pub. No.: WO2020/203874
PCT Pub. Date: Oct. 8, 2020

(65) Prior Publication Data
US 2022/0186331 A1    Jun. 16, 2022

(30) Foreign Application Priority Data

Mar. 29, 2019  (JP) .................................. 2019-069150
Feb. 6, 2020  (JP) .................................. 2020-019189

(51) Int. Cl.
*C21D 9/08*    (2006.01)
*B23K 11/08*    (2006.01)
(Continued)

(52) U.S. Cl.
CPC ............ *C21D 9/08* (2013.01); *B23K 11/0873* (2013.01); *B23K 11/16* (2013.01); *C22C 38/002* (2013.01);
(Continued)

(58) Field of Classification Search
CPC ................ C21D 9/08; C21D 2211/005; C21D 2211/009; C21D 1/25; C21D 1/28;
(Continued)

(56) References Cited

U.S. PATENT DOCUMENTS

2015/0176101 A1    6/2015   Ishitsuka et al.
2018/0305780 A1*  10/2018   Aratani ................ C22C 38/002
2021/0277507 A1    9/2021   Aratani et al.

FOREIGN PATENT DOCUMENTS

JP            61045688 B    10/1986
JP            01058264 B    12/1989
(Continued)

*Primary Examiner* — Anthony M Liang
*Assistant Examiner* — Danny N Kang
(74) *Attorney, Agent, or Firm* — Greer Burns & Crain Ltd.

(57) ABSTRACT

This electric resistance-welded steel tube for a hollow stabilizer is an electric resistance-welded steel tube for a hollow stabilizer including a base material portion and a weld, in which the base material portion has predetermined chemical components, a wall thickness of the base material portion is 2.0 to 6.0 mm, an outer diameter of the electric resistance-welded steel tube is 10 to 40 mm, in a C direction cross section of the electric resistance-welded steel tube, a recessed bead cut is present in a region including the weld on an inner surface side of the electric resistance-welded steel tube, when an imaginary line is drawn from one opening edge to the other opening edge of the bead cut in a shortest distance, a maximum depth from the imaginary line to a bottom of the bead cut is 300 μm or less, a maximum inclusion diameter that is included in the base material (Continued)

portion is 300 μm or less, in the base material portion of the electric resistance-welded steel tube, a surface roughness of the inner surface side is 300 μm or less in terms of a maximum profile valley depth Rv, and maximum hardness of the electric resistance-welded steel tube including the weld is 300 Hv or less.

10 Claims, 5 Drawing Sheets

(51) Int. Cl.
*B23K 11/087* (2006.01)
*B23K 11/16* (2006.01)
*C22C 38/00* (2006.01)
*C22C 38/02* (2006.01)
*C22C 38/04* (2006.01)
*C22C 38/06* (2006.01)
*C22C 38/22* (2006.01)
*C22C 38/28* (2006.01)
*C22C 38/32* (2006.01)
*B23K 101/06* (2006.01)
*B23K 103/04* (2006.01)

(52) U.S. Cl.
CPC .............. *C22C 38/02* (2013.01); *C22C 38/04* (2013.01); *C22C 38/06* (2013.01); *C22C 38/22* (2013.01); *C22C 38/28* (2013.01); *C22C 38/32* (2013.01); *B23K 2101/06* (2018.08); *B23K 2103/04* (2018.08); *C21D 2211/005* (2013.01); *C21D 2211/009* (2013.01)

(58) Field of Classification Search
CPC .......... C21D 9/085; C21D 8/105; C21D 9/50; B23K 11/0873; B23K 11/16; B23K 2101/06; B23K 2103/04; C22C 38/002; C22C 38/02; C22C 38/04; C22C 38/06; C22C 38/22; C22C 38/28; C22C 38/32; C22C 38/24; C22C 38/20; C22C 38/001; C22C 38/44; C22C 38/50; C22C 38/54
See application file for complete search history.

(56) References Cited

FOREIGN PATENT DOCUMENTS

| | | |
|---|---|---|
| JP | 06093339 A | 4/1994 |
| JP | 5516780 B | 11/2014 |
| WO | 2013175821 A1 | 11/2013 |
| WO | 2017056384 A1 | 4/2017 |
| WO | 2018079398 A1 | 5/2018 |

\* cited by examiner

ELECTRIC RESISTANCE-WELDED STEEL TUBE FOR HOLLOW STABILIZER, HOLLOW STABILIZER, AND MANUFACTURING METHODS OF SAME

TECHNICAL FIELD OF THE INVENTION

The present invention relates to an electric resistance-welded steel tube for a hollow stabilizer, a hollow stabilizer, and manufacturing methods of the same.

Priority is claimed on Japanese Patent Application No. 2019-069150, filed in Japan on Mar. 29, 2019 and Japanese Patent Application No. 2020-019189, filed in Japan on Feb. 6, 2020, the contents of which are incorporated herein by reference.

RELATED ART

In recent years, from the viewpoint of global environmental conservation, exhaust gas regulations for automobiles have been tightened, and weight reduction of automobile vehicle bodies has been promoted in order to improve fuel efficiencies. As one of methods for reducing the weights of vehicle bodies, studies are underway to change solid components for which a steel bar is used to hollow components for which a steel tube is used.

For example, even for stabilizers that suppress the rolling of vehicle bodies during cornering or improve running stability during high-speed running, studies are underway to reduce the weights of vehicle bodies by changing solid components for which a steel bar is used to hollow components (hollow stabilizers) for which a steel tube is used.

Electric resistance-welded steel tubes are in wide use as a material for hollow stabilizers due to the relatively inexpensive prices and the excellent dimensional accuracy.

For example, Patent Document 1 discloses a steel for an electric resistance-welded steel tube for a hollow stabilizer containing C: 0.35% or less, Si: 0.25% or less, Mn: 0.30% to 1.20%, Cr: less than 0.50%, N+O: 0.0200% or less, Ti: 4 to 12 times (N+O) in steel, and B: 0.0005% to 0.009%, or, furthermore, Ca: 200 ppm or less and/or Nb: C×4/10 or less, in which C, Si, Mn, and Cr contents are adjusted such that a DI value reaches 1.0 in. or more, and furthermore, the C, Si, Mn, and Cr contents are adjusted such that Ceq reaches 0.60% or less.

In addition, Patent Document 2 discloses a manufacturing method of a steel for an electric resistance-welded steel tube for a hollow stabilizer, in which a slab of steel containing C: 0.35% or less, Si: 0.25% or less, Mn: 0.30% to 1.20%, Cr: less than 0.50%, N+O: 0.0200% or less, Ti: 4 to 12 times (N+O) in the steel, and B: 0.0005% to 0.009%, or, furthermore, Ca: 200 ppm or less, in which C, Si, Mn, and Cr contents are adjusted such that a DI value reaches 1.0 in. or more, and furthermore, the C, Si, Mn, and Cr contents are adjusted such that Ceq reaches 0.60% or less, is hot-rolled and coiled at a coiling temperature of 570° C. to 690° C.

In addition, Patent Document 3 proposes a manufacturing method of a high-strength electric resistance-welded steel tube having high-ductility that can be used for stabilizers and the like. Patent Document 3 discloses that on an electric resistance-welded steel tube made of, as a material, steel containing C: 0.18% to 0.28%, Si: 0.10% to 0.50%, Mn: 0.60% to 1.80%, Ti: 0.020% to 0.050%, B: 0.0005% to 0.0050%, furthermore, one or more of Cr: 0.20% to 0.50%, Mo: 0.5% or less, and Nb: 0.015% to 0.050%, and/or furthermore, Ca: 0.0050% or less, a normalization treatment is performed at 850° C. to 950° C., and then quenching is performed.

A hollow stabilizer is manufactured using a thick electric resistance-welded steel tube having a required wall thickness/outer diameter ratio that is provided by further drawing an electric resistance-welded steel tube or without drawing (as it is) by 1) forming the steel tube into a required shape by a cold forming process such as bending, quenching the steel tube by heating and water cooling, and then tempering the steel tube or by 2) heating the thick electric resistance-welded steel tube, forming the steel tube into a required shape by a hot forming process such as pressing, subsequently, quenching the steel sheet by water cooling, and then tempering the steel tube. In particular, the latter method by a hot forming process is superior to the former method by a cold forming process in terms of the easiness of process forming and the capability of forming complicated shapes and is thus advantageous as a manufacturing process.

However, in the case of performing such a hot forming process, there is a case where the fatigue strength of the steel tube decreases because the hardenability in a weld portion lacks in the electric resistance-welded steel tubes described in Patent Documents 1 to 3.

In response to such a problem, Patent Document 4 discloses an electric resistance-welded steel tube having a composition containing, by mass %, C: 0.15% to 0.40%, Si: 0.05% to 0.50%, Mn: 0.30% to 2.00%, Al: 0.01% to 0.10%, Ti: 0.001% to 0.04%, B: 0.0005% to 0.0050%, N: 0.0010% to 0.0100%, and a remainder including Fe and an unavoidable impurity, in which Ti and N satisfy (N/14)<(Ti/47.9), and a bond width of an electric resistance weld portion is 25 μm or less.

Patent Document 4 describes that, when the width of a decarburized layer that is formed during welding is reduced to 25 μm or less, a decrease in the quenching hardness of the electric resistance weld portion can be suppressed, and durability against fatigue improves.

However, as a result of studies, the present inventors found that, in the electric resistance-welded steel tube of Patent Document 4, a certain degree of a fatigue strength improvement effect can be obtained, but there is a case where sufficient durability (fatigue strength) cannot be obtained due to the influence of the shape of the weld portion, the roughness of the inside surface of the steel tube, an inclusion or the like that is included in the steel tube.

PRIOR ART DOCUMENT

Patent Document

[Patent Document 1] Japanese Examined Patent Application, Second Publication No. H1-58264
[Patent Document 2] Japanese Examined Patent Application, Second Publication No. S61-45688
[Patent Document 3] Japanese Unexamined Patent Application, First Publication No. H6-93339
[Patent Document 4] Japanese Patent No. 5516780

DISCLOSURE OF THE INVENTION

Problems to be Solved by the Invention

The present invention has been made in view of the above-described problem. An object of the present invention is to provide an electric resistance-welded steel tube for a hollow stabilizer that has sufficient workability and is excellent in terms of fatigue strength after quenching and tempering, a hollow stabilizer that is excellent in terms of fatigue strength, and manufacturing methods of the same.

Means for Solving the Problem

The present inventors paid attention to the relationship between the fatigue strength and a bead cut on the inner surface and the inner surface roughness of an electric resistance-welded steel tube and performed intensive investigation. As a result, the following facts were found.
- (i) When the maximum value of any of the depth of a bead cut and the inner surface roughness (depth) is large, the fatigue strength deteriorates.
- (ii) Fatigue fracture attributed to a bead cut or the inner surface roughness is a crack from the inside surface.

Meanwhile, as a result of studies by the present inventors, it was found that, even in a case where the depth of a bead cut or the inner surface roughness is suppressed, fatigue fracture as described below occurs.
- (I) Fatigue fracture is promoted by an elongated inclusion such as MnS.
- (II) Such fracture originated from an inclusion is fracture not from the steel surface but from the inside.

From these facts, the present inventors found that, in electric resistance-welded steel tubes that are preferably used as hollow stabilizers, not only the components of a steel sheet that is subjected to electric resistance welding but also the inner surface roughness of a steel tube, the shape of a weld portion (bead cut), the size of an inclusion, or the like have a significant influence on the fatigue strength.

In addition, the present inventors found that the above-described characteristics of electric resistance-welded steel tubes also have an influence on the fatigue strengths of hollow stabilizers that are obtained by performing a process or a heat treatment on electric resistance-welded steel tubes.

The present invention has been made based on the above-described finding, and the gist thereof is as described below.

[1] An electric resistance-welded steel tube for a hollow stabilizer according to one aspect of the present invention is an electric resistance-welded steel tube for a hollow stabilizer including a base material portion and a weld portion, in which the base material portion contains, as chemical components, by mass %, C: 0.30% to 0.38%, Si: 0.15% to 0.30%, Mn: 1.20% to 1.50%, Al: 0.020% to 0.060%, Ti: 0.020% to 0.050%, B: 0.0010% to 0.0050%, Cr: 0.10% to 0.25%, Mo: 0% to 0.20%, Ca: 0.0005% to 0.0050%, Cu: 0% to 0.25%, Ni: 0% to 0.25%, V: 0% to 0.05%, N: 0.0060% or less, P: 0.020% or less, S: 0.0100% or less, and O: 0.0050% or less, a remainder includes Fe and impurities, a wall thickness of the base material portion is 2.0 to 6.0 mm, and an outer diameter of the electric resistance-welded steel tube is 10 to 40 mm, in a C direction cross section of the electric resistance-welded steel tube, a recessed bead cut is present in a region including the weld portion on an inner surface side of the electric resistance-welded steel tube, and, when an imaginary line is drawn from one opening edge to the other opening edge of the bead cut in a shortest distance, a maximum depth from the imaginary line to a bottom of the bead cut is 300 μm or less, a maximum inclusion diameter that is included in the base material portion is 300 μm or less, in the base material portion of the electric resistance-welded steel tube, a surface roughness of the inner surface side is 300 μm or less in terms of a maximum profile valley depth Rv, and maximum hardness of the electric resistance-welded steel tube including the weld portion is 300 Hv or less.

[2] In the electric resistance-welded steel tube for a hollow stabilizer according to [1], the chemical components of the base material portion may satisfy the following Formula (1).

$$Ca \times (1-124 \times O)/(1.25 \times S) \geq 0.20 \quad (1)$$

[3] In the electric resistance-welded steel tube for a hollow stabilizer according to [1] or [2], the chemical components of the base material portion may contain one or more selected from the group consisting of Cu: 0.05% to 0.25%, Ni: 0.05% to 0.25%, and V: 0.01% to 0.05%.

[4] In the electric resistance-welded steel tube for a hollow stabilizer according to any one of [1] to [3], a metallographic structure of the base material portion may include 40% to 60% of ferrite and 60% to 40% of pearlite in terms of an area ratio.

[5] A manufacturing method of an electric resistance-welded steel tube for a hollow stabilizer according to another aspect of the present invention is a manufacturing method of the electric resistance-welded steel tube for a hollow stabilizer according to any one of [1] to [4], the method including performing a heat treatment of heating an electric resistance-welded steel tube formed by electric resistance welding to 800° C. or higher and 1000° C. or lower and then naturally cooling the electric resistance-welded steel tube.

[6] A hollow stabilizer according to another aspect of the present invention is a hollow stabilizer including a base material portion and a weld portion, in which the base material portion contains, as chemical components, by mass %, C: 0.30% to 0.38%, Si: 0.15% to 0.30%, Mn: 1.20% to 1.50%, Al: 0.020% to 0.060%, Ti: 0.020% to 0.050%, B: 0.0010% to 0.0050%, Cr: 0.10% to 0.25%, Mo: 0% to 0.20%, Ca: 0.0005% to 0.0050%, Cu: 0% to 0.25%, Ni: 0% to 0.25%, V: 0% to 0.05%, N: 0.0060% or less, P: 0.020% or less, S: 0.0100% or less, and O:0.0050% or less, a remainder includes Fe and impurities, a wall thickness of the base material portion is 2.0 to 6.0 mm, and an outer diameter of the base material portion is 10 to 40 mm, in a C direction cross section, a recessed part is present in a region including the weld portion on an inner surface side of a hollow portion of the hollow stabilizer, and, when an imaginary line is drawn from one end portion to the other end portion on an inner surface side of the weld portion in a shortest distance, a maximum depth from the imaginary line to a bottom of the recessed part is 300 μm or less, a maximum inclusion diameter that is included in the base material portion is 300 μm or less, in the base material portion, a surface roughness of the inner surface side is 300 μm or less in terms of a maximum profile valley depth Rv, and surface hardness is 455 Hv or more.

[7] In the hollow stabilizer according to [6], the chemical components of the base material portion may satisfy the following Formula (2).

$$Ca \times (1-124 \times O)/(1.25 \times S) \geq 0.20 \quad (2)$$

[8] In the hollow stabilizer according to [6] or [7], the chemical components of the base material portion may contain one or more selected from the group consisting of Cu: 0.05% to 0.25%, Ni: 0.05% to 0.25%, and V: 0.01% to 0.05%.

[9] A manufacturing method of a hollow stabilizer according to another aspect of the present invention is a manufacturing method of the hollow stabilizer according to any one of [6] to [8], the method including a tube drawing step of drawing the electric resistance-welded steel tube for a hollow stabilizer according to any one of [1] to [4], a heat treatment step of heating the electric resistance-welded steel tube to 800° C. to 1000° C. after the tube drawing step, a processing step of processing the electric resistance-welded steel tube into a hollow stabilizer shape after the heat treatment step, a quenching step of heating the electric resistance-welded steel tube to 900° C. to 1200° C. after the processing step and then cooling the electric resistance-welded steel tube at a cooling rate of 30° C./s or faster, and a tempering step of heating the electric resistance-welded steel tube to 200° C. to 400° C. after the quenching step.

[10] A manufacturing method of a hollow stabilizer according to another aspect of the present invention is a manufacturing method of the hollow stabilizer according to any one of [6] to [8], the method including a processing step of processing the electric resistance-welded steel tube for a hollow stabilizer according to any one of [1] to [4] into a hollow stabilizer shape, a quenching step of heating the electric resistance-welded steel tube to 900° C. to 1200° C. after the processing step and then cooling the electric resistance-welded steel tube at a cooling rate of 30° C./s or faster, and a tempering step of heating the electric resistance-welded steel tube to 200° C. to 400° C. after the quenching step.

Effects of the Invention

According to the above-described aspects of the present invention, it is possible to provide an electric resistance-welded steel tube that is excellent in terms of workability and fatigue strength after quenching and tempering, a hollow stabilizer having excellent fatigue strength, and manufacturing methods of the same.

The electric resistance-welded steel tube of the present invention is also excellent in terms of fatigue strength after a heat treatment such as processing or quenching and tempering is performed. In addition, the electric resistance-welded steel tube of the present invention also secures cold workability as favorable as or more favorable than that of conventional steel tubes. Therefore, the electric resistance-welded steel tube of the present invention is preferable as an electric resistance-welded steel tube for a hollow stabilizer. In addition, the hollow stabilizer of the present invention has excellent fatigue strength and is capable of contributing to the weight reduction of automobile vehicle bodies if applied as vehicle components.

EMBODIMENTS OF THE INVENTION

Hereinafter, an electric resistance-welded steel tube for a hollow stabilizer according to an embodiment of the present invention (the electric resistance-welded steel tube according to the present embodiment) and a hollow stabilizer according to an embodiment of the present invention (the hollow stabilizer according to the present embodiment) will be described.

First, the electric resistance-welded steel tube according to the present embodiment will be described with reference to the drawings.

Figure 1:
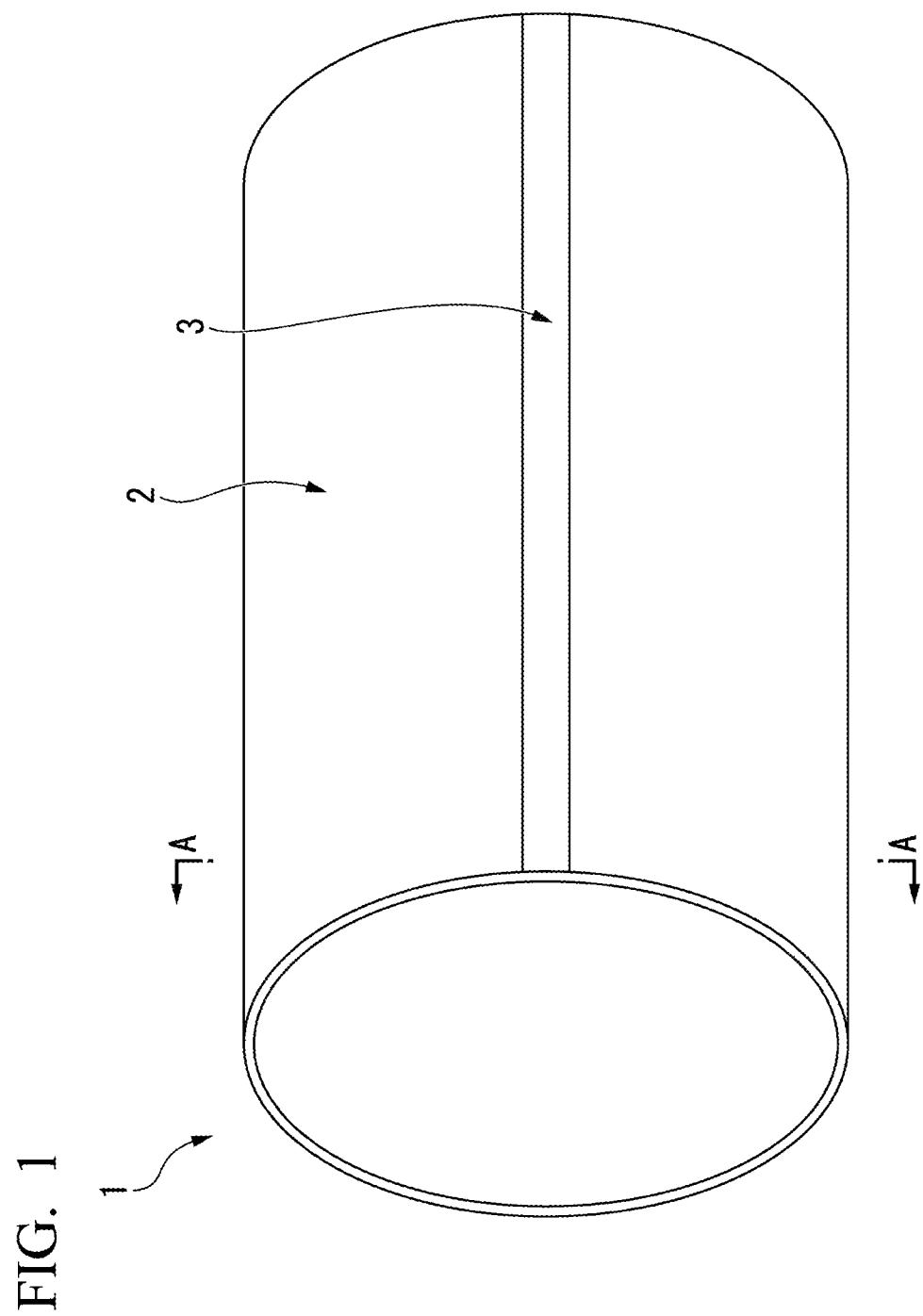
FIG. 1 is a view showing an example of an electric resistance-welded steel tube according to the present embodiment.

With reference to FIG. 1, an electric resistance-welded steel tube 1 according to the present embodiment includes a base material portion 2 having a predetermined chemical composition and a weld portion 3.

In addition, the electric resistance-welded steel tube 1 according to the present embodiment is assumed to be applied to a hollow stabilizer, and the base material portion 2 (steel sheet) of the electric resistance-welded steel tube has a wall thickness of 2.0 to 6.0 mm and an outer diameter of 10 to 40 mm.

The electric resistance-welded steel tube 1 according to the present embodiment is obtained by forming a steel sheet such as a hot rolled steel sheet or a cold rolled steel sheet, which serves as a material of the steel tube, into a tube shape with a forming roll or the like and welding butt portions by electric resistance welding. Due to the electric resistance welding, the end portions of the steel tube are melted, the coexisting solid and liquid phase is squeezed while the liquid phase is discharged, and the end portions are joined together. The joint portion and welded heat-affected zones form the weld portion 3, and a portion that is not affected by the heat during the electric resistance welding is the base material portion 2.

Figure 2A:
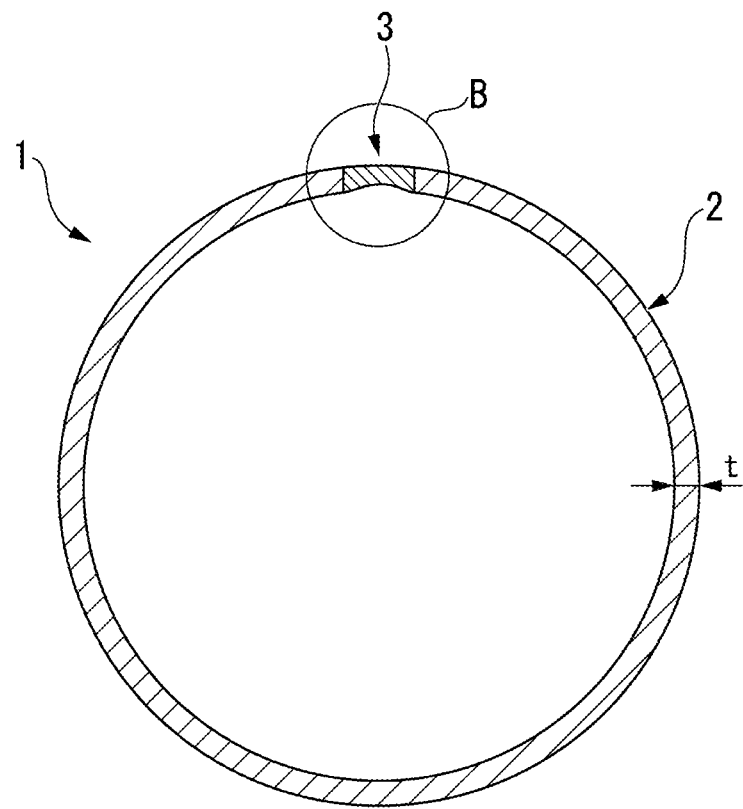
FIG. 2A is a cross section view taken along a line A-A of the electric resistance-welded steel tube according to the present embodiment shown in FIG. 1.
Figure 2B:
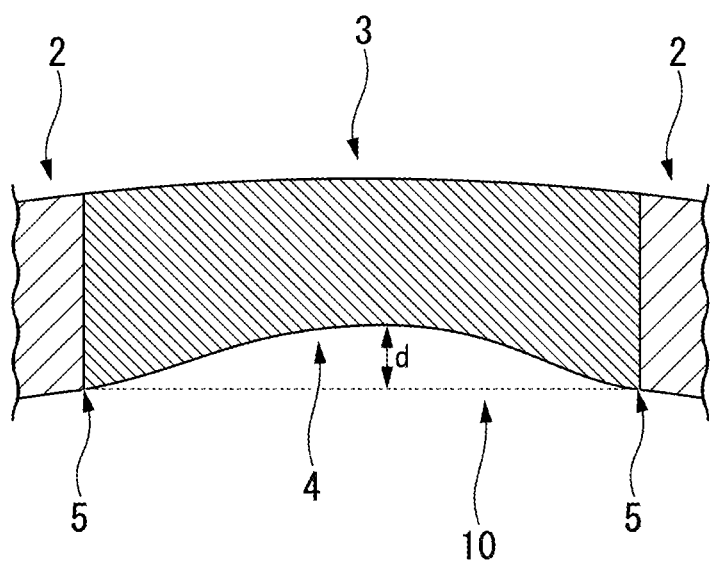
FIG. 2B is an enlarged view of a range B in FIG. 2A.

Additionally, in the electric resistance-welded steel tube 1 according to the present embodiment, in a C direction cross section (cross section perpendicular to a tube axis direction) of the electric resistance-welded steel tube, since a region including the weld portion 3 (including the weld portion 3 and the peripheral region in some cases) on at least the inner surface side of the electric resistance-welded steel tube 1 is mechanically cut, a recessed bead cut 4 is present in the region including the weld portion 3 as shown in FIG. 2B.

Chemical Components

The base material portion of the steel tube contains the following elements as the chemical components. In the present embodiment, "%" relating to the chemical components is "mass %" unless otherwise specified.

C: 0.30% to 0.38%

C is an element that is solid-soluted in steel or precipitated as a carbide in steel to increase the strength of steel. In order to secure a strength that is ordinarily required in the case of using the steel tube as a hollow stabilizer, the C content is set to 0.30% or more. On the other hand, when the C content exceeds 0.38%, the workability or the weldability deteriorates. Therefore, the C content is set to 0.38% or less. The C content is preferably 0.33% to 0.37%.

Si: 0.15% to 0.30%

Si is an element that contributes to solid solution strengthening. In order to obtain this effect, the Si content is set to 0.15% or more. On the other hand, when the Si content exceeds 0.30%, a Si-Mn-based inclusion, which acts as a welding defect during electric resistance welding, is likely to be generated. Therefore, the Si content is set to 0.30% or less. The Si content is preferably 0.20% to 0.30%.

Mn: 1.20% to 1.50%

Mn is an element that improves the hardenability of steel to contribute to the improvement of strength. In order to obtain this effect, the Mn content is set to 1.20% or more. On the other hand, when the Mn content exceeds 1.50%, the weldability deteriorates or a coarse inclusion such as MnS is generated in the weld portion, which decreases the fatigue strength. Therefore, the Mn content is set to 1.50% or less. The Mn content is preferably 1.20% to 1.40%.

Al: 0.020% to 0.060%

Al is an element that acts as a deoxidizing agent and an element having an effect of fixing N and securing the amount of solute B that is effective for the improvement of hardenability. In order to obtain such an effect, the Al content is set to 0.020% or more. On the other hand, when the Al content exceeds 0.060%, a number of inclusions are formed, and there is a case where the fatigue strength decrease. Therefore, the Al content is set to 0.060% or less. The Al content is preferably 0.020% to 0.050%.

Ti: 0.020% to 0.050%

Ti is an effective element for fixing N and securing the amount of solute B that is effective for the improvement of hardenability. In addition, Ti is an element that is precipitated as a fine carbide, suppresses the coarsening of crystal grains during welding or a heat treatment, and contributes to the improvement of the toughness. In order to obtain such an effect, the Ti content is set to 0.020% or more. On the other hand, when the Ti content exceeds 0.050%, a coarse inclusion is formed, and the toughness or fatigue strength decreases. Therefore, the Ti content is set to 0.050% or less. The Ti content is preferably 0.020% to 0.040%.

B: 0.0010% to 0.0050%

B is an element that significantly improves the hardenability of steel materials by being contained in a small amount. In addition, B is also an element having an effect of grain boundary strengthening. In order to obtain these effects, the B content is set to 0.0010% or more. On the other hand, when the B content exceeds 0.0050%, there is a case where a coarse B-containing precipitate is generated and the toughness decreases. Therefore, the B content is set to 0.0050% or less. The B content is preferably 0.0020% to 0.0035%.

Cr: 0.10% to 0.25%

Cr is an element that improves the hardenability of steel. In order to obtain this effect, the Cr content is set to 0.10% or more. On the other hand, when the Cr content exceeds 0.25%, an inclusion is generated in the weld portion, and the cleanliness of the weld portion deteriorates. Therefore, the Cr content is set to 0.25% or less. The Cr content is preferably 0.10% to 0.20%.

Ca: 0.0005% to 0.0050%

Ca is an element that refines an inclusion in the steel tube and contributes to the improvement of the fatigue strength. When the Ca content is less than 0.0005%, this effect cannot be sufficiently obtained. Therefore, the Ca content is set to 0.0005% or more. On the other hand, when the Ca content exceeds 0.0050%, a coarse inclusion is formed, and the toughness or the fatigue strength decreases. Therefore, the Ca content is set to 0.0050% or less. The Ca content is preferably 0.0010% to 0.0030%.

Mo: 0% to 0.20%

Since Mo does not necessarily need to be contained, the lower limit thereof is 0%. However, Mo is an element that improves the hardenability of steel and improves the strength of steel by solid solution strengthening. In the case of obtaining the above-described effect, the Mo content is preferably set to 0.05% or more. On the other hand, when the Mo content exceeds 0.20%, a coarse carbide is formed, and the toughness deteriorates. Therefore, the Mo content is set to 0.20% or less. The Mo content is preferably 0.05% to 0.10%.

Cu: 0% to 0.25%

Since Cu does not necessarily need to be contained, the lower limit thereof is 0%. However, Cu is an element having an effect of not only improving the hardenability but also enhancing the delayed fracture resistance property and may be contained. In the case of obtaining the above-described effect, the Cu content is preferably set to 0.05% or more. On the other hand, when the Cu content exceeds 0.25%, there is a concern that the workability may deteriorate. Therefore, even in a case where Cu is contained, the Cu content is set to 0.25% or less. The Cu content is preferably 0.05% to 0.10%.

Ni: 0% to 0.25%

Since Ni does not necessarily need to be contained, the lower limit thereof is 0%. However, Ni is an element having an effect of not only improving the hardenability but also enhancing the delayed fracture resistance property and may be contained. In the case of obtaining the above-described effect, the Ni content is preferably set to 0.05% or more. On the other hand, Ni is an expensive element, but the effect is saturated even when the Ni content exceeds 0.25%. Therefore, even in a case where Ni is contained, the Ni content is set to 0.25% or less. The Ni content is preferably 0.05% to 0.10%.

V: 0% to 0.05%

Since V does not necessarily need to be contained, the lower limit thereof is 0%. However, V is an effective element for improving the strength of steel and may be contained. In the case of obtaining the above-described effect, the V content is preferably set to 0.01% or more. On the other hand, when the V content exceeds 0.05%, there is a concern that the workability may deteriorate. Therefore, even in a case where V is contained, the V content is set to 0.05% or less.

N: 0.0060% or Less

N is contained as an impurity. When the N content exceeds 0.0060%, N is precipitated as BN, whereby there is a case where the hardenability improvement effect of solute N weakens or the toughness deteriorates due to the coarsening and age hardening of a nitride. Therefore, the N content is set to 0.0060% or less. Meanwhile, N is an element that contributes to the improvement of the strength by a nitride or a carbonitride. Therefore, the N content may be set to 0.0010% or more.

P: 0.020% or Less

P is an impurity element that adversely affects the weld crack resistance and the toughness. The P content is preferably as low as possible, but a content of 0.020% or less is acceptable. Therefore, the P content is set to 0.020% or less. The P content is preferably 0.015% or less.

S: 0.0100% or Less

S is an impurity element that affects the formation of a non-metal inclusion such as MnS in steel materials and degrades the fatigue strength and the workability. In addition, S is also an element that adversely affects the toughness or anisotropy and the reheat cracking susceptibility. The S content is preferably as low as possible, but a content of 0.0100% or less is acceptable. Therefore, the S content is set to 0.0100% or less. The S content is preferably 0.0050% or less.

O: 0.0050% or Less

O is an element that is present in steel mainly as an oxide-based inclusion and degrades the workability, toughness, and fatigue strength of the steel tube. The O content is preferably as low as possible, but a content of 0.0050% or less is acceptable. Therefore, the O content is set to 0.0050% or less. The O content is preferably 0.0040% or less.

Remainder: Fe and Impurities

Basically, the electric resistance-welded steel tube according to the present embodiment basically contains the above-described elements, and the remainder includes Fe and impurities. The impurities may be impurities that are contained in a raw material such as ore or a scrap or impurities that mixes in during manufacturing steps. As the impurities, in addition to P, S, N, and O described above, H is an exemplary example.

$$Ca \times (1 - 124 \times O)/(1.25 \times S) \geq 0.20$$

In the electric resistance-welded steel tube 1 according to the present embodiment, it is preferable that while the amounts of the individual elements are limited to the above-described ranges, an ESSP value represented by Formula (1) below is 0.20 or more.

$$ESSP\ value = Ca \times (1 - 124 \times O)/(1.25 \times S) \tag{1}$$

The ESSP value is an index regarding residual Ca (effective Ca) excluding Ca that has bonded with oxygen. Specifically, the ESSP value is an index showing, with an assumption that Ca bonds with S according to the atomic weight ratio, whether or not effective Ca is present in an amount that is considered to be necessary according to the S content.

When the ESSP is less than 0.20, the Ca content is insufficient with respect to the O content and the S content, and MnS is likely to be generated. Since MnS stretched by rolling causes the fatigue strength or acts as an origin of a decrease hydrogen cracking, the ESSP is preferably set to 0.20 or more.

<Maximum Depth of Bead Cut: 300 µm or Less, Preferably 100 µm or Less>

Usually, an electric resistance-welded steel tube is obtained by forming a steel sheet into a tube shape with a group of forming rolls while running the steel sheet to produce an open tube, melting both end portions of the steel sheet, which has been produced as an open tube, in the sheet width direction that have been butted to each other by heating such as induction heating, and welding both end portions of the steel sheet in the sheet width direction together by pressing both end portions in a molten state with a pair of squeeze rolls, thereby forming an electric resistance weld portion. At this time, a part of the molten metal formed between both end portions of the steel sheet in the sheet width direction is pressed out, and thus a weld bead that protrudes from the surface of the electric resistance-welded steel tube is formed in the weld portion. This weld bead acts as a cause for poor processing in subsequent steps and thus acts as a cause for the deterioration of the external appearance of an electric resistance-welded steel tube that is used as a final product. Therefore, this weld bead is cut with a cutting jig or the like (bead cut).

Therefore, as shown in FIG. 2A and FIG. 2B, in the electric resistance-welded steel tube 1 according to the present embodiment, a recessed bead cut 4 is present in a region including the weld portion 3 on the inner surface side of the electric resistance-welded steel tube 1 when the electric resistance-welded steel tube 1 is viewed in a cross section in a direction perpendicular to the tube axis direction (C-cross section).

Figure 3:
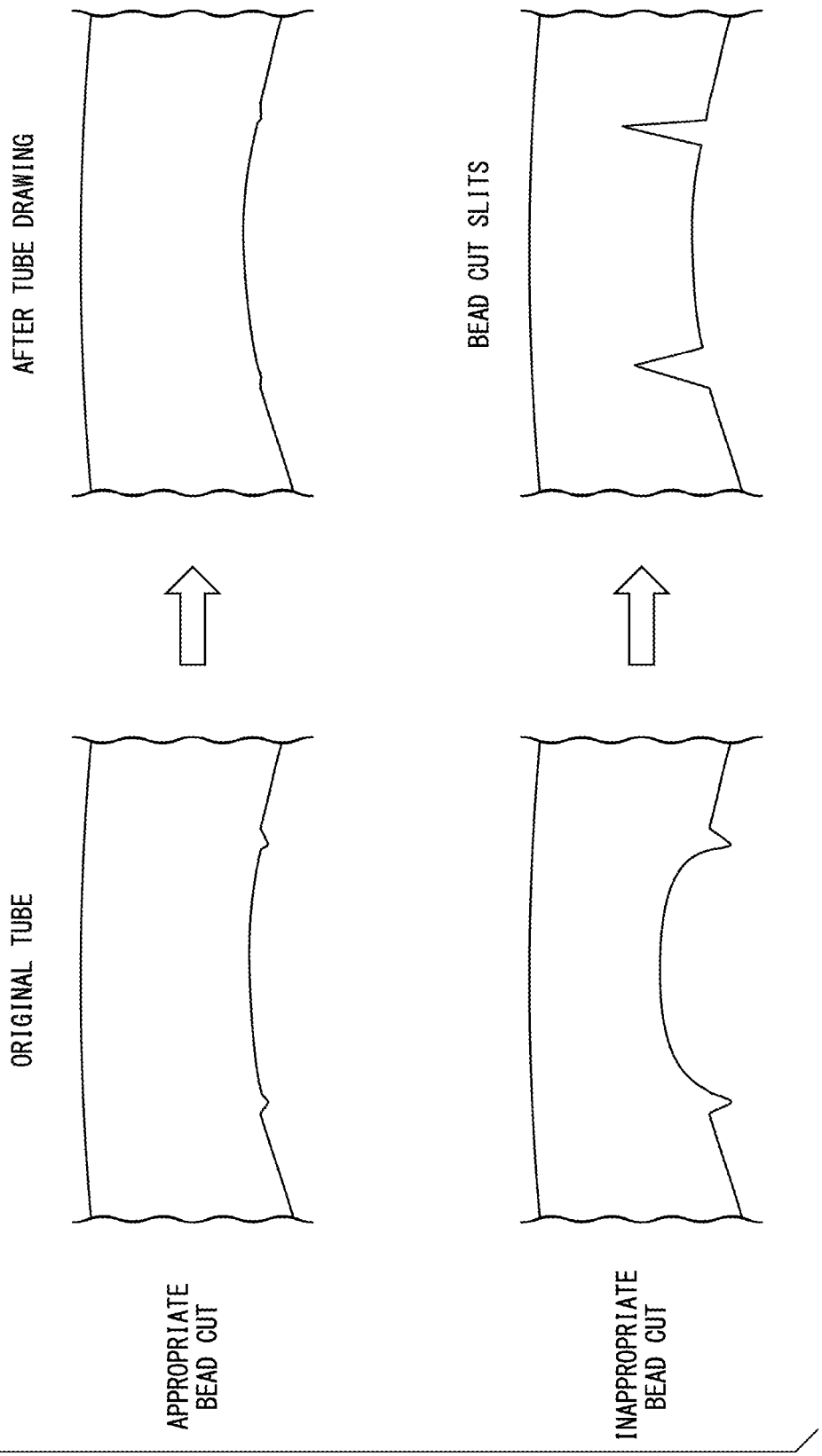
FIG. 3 is a view schematically showing a bead cut depth before and after tube drawing.

As a result of studies, the present inventors newly found that, as shown in FIG. 3, the shape of the weld portion after the weld bead is cut, particularly, the bead cut depth on the inner surface side of the electric resistance-welded steel tube significantly affects not only the workability but also the fatigue strength. It was found that, for example, when the weld portion is excessively cut in the bead cut, the bead cut slits the tube after the extension of the tube, cracks are generated from the slit portions, and the steel tube fractures at an early stage.

In addition, as a result of additional studies, the present inventors found that, at the time of drawing an imaginary line 10 from one opening edge 5 to the other opening edge 5 of the bead cut 4 in the shortest distance, when a bead cut depth d, which is the maximum depth from the imaginary line 10 to the bottom of the recessed bead cut 4 (in other words, the maximum value of the distances from the imaginary line 10 to the bottom of the recessed bead cut 4 in a direction perpendicular to the imaginary line 10), exceeds 300 µm, slits of a reference depth or more are generated after the extension of the steel tube, and fatigue cracks are initiated and propagate from the slit portions at an early stage, which decreases the fatigue strength and makes it impossible for the steel tube to stably withstand 80,000 times of the repetition of a load stress before being fractured in a fatigue test, which is a reference value of the fatigue strength in the present embodiment, after quenching and tempering. Therefore, in the electric resistance-welded steel tube 1 according to the present embodiment, at the time of drawing the imaginary line 10 from one opening edge 5 to the other opening edge 5 of the bead cut 4 in the shortest distance, the maximum depth from the imaginary line 10 to the bottom of the bead cut 4 (bead cut depth d) is set to 300 µm or less. The bead cut depth d is preferably 100 µm or less.

Since the bead cut depth is improved by the extension of the steel tube, 300 µm, which is a reference for the slitting of the bead cut after the extension of the steel tube, was set as the upper limit of the bead cut depth d of the steel tube before the extension of the steel tube. When the bead cut depth before the extension of the steel tube is 300 µm or less, the bead cut depth after the extension of the steel tube becomes 300 µm or less.

In the electric resistance-welded steel tube 1 according to the present embodiment, there is no need to specify the lower limit of the bead cut depth d, and the bead cut depth d is preferably as small as possible.

The bead cut depth d as described above can be controlled by appropriately setting the position of a cutting tool at the time of cutting the weld bead formed by electric resistance welding.

In addition, since fatigue fracture is mainly initiated from the inner surface side, the shape of the weld portion 3 on the outer surface side of the electric resistance-welded steel tube 1 is not particularly limited, but the weld bead may be cut in the same manner as in conventional electric resistance-welded steel tubes in order to improve the external appearance.

The bead cut depth d can be measured by the following method. That is, the bead cut depth d is measured by measuring the maximum wall thickness beside the weld portion and the wall thicknesses of the weld portion (welded butt portion) with a micrometer and subtracting the wall thickness of the thinnest portion of the weld portion from the maximum wall thickness.

<Surface Roughness on Inner Surface Side in Base Material Portion of Steel Tube: 300 μm or Less and Preferably 100 μm or Less in Terms of Maximum Profile Valley Depth Rv>

Fatigue fracture originated from the weld portion 3 on the inner surface of the steel tube can be suppressed by controlling the above-described shape of the weld portion. However, since fatigue fracture is also initiated from a portion other than the weld portion, only the control of the shape of the weld portion does not sufficiently improve the fatigue strength.

Figure 4:
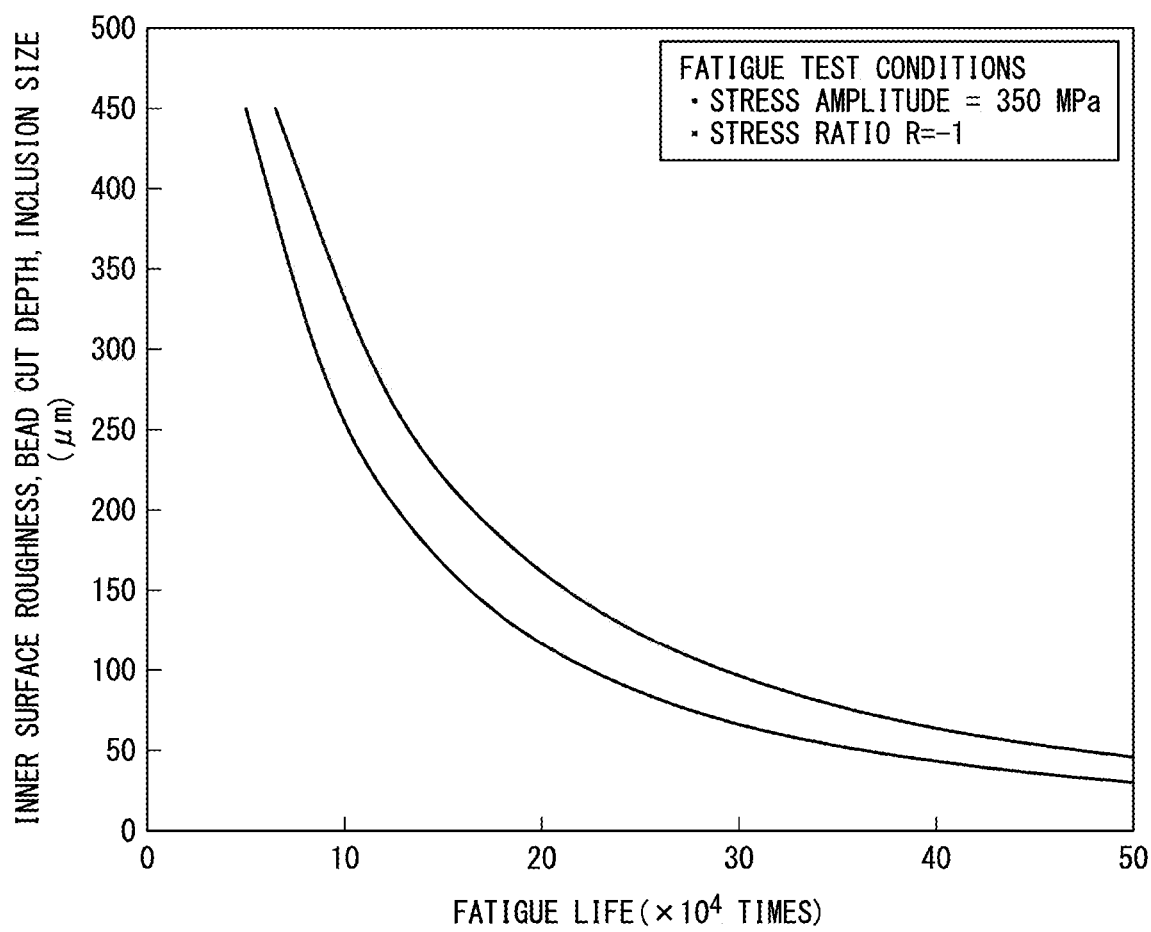
FIG. 4 is a view showing a relationship between a defect depth (a largest value among an inside surface roughness, a bead cut depth, or a maximum inclusion diameter) and a fatigue life.

As a result of studies, the present inventors found that, as shown in FIG. 4, as the surface roughness in the base material portion 2 on the inner surface side of the electric resistance-welded steel tube 1 increases, the fatigue strength decreases.

Therefore, in the electric resistance-welded steel tube 1 according to the present embodiment, the surface roughness on the inner surface side in the base material portion 2 is set to 300 μm or less in terms of the maximum profile valley depth Rv specified in JIS B 0601: 2013. When the maximum profile valley depth Rv of the surface on the inner surface side (inside surface) exceeds 300 μm, fatigue cracks are initiated and propagate at an early stage, which decreases the fatigue strength and makes it impossible to stably satisfy 80,000 times of the repetition, which is a reference value of the fatigue strength in the present embodiment, after quenching and tempering. The maximum profile valley depth Rv of the surface is preferably 100 μm or less.

The above-described maximum profile valley depth Rv can be obtained by appropriately performing rolling, pickling, or the like for scale control or the like and appropriately performing transfer during the manufacturing, transportation, or the like of steel material to suppress a corrosion hole or a scratch.

The above-described surface roughness on the inner surface side in the base material portion 2 of the steel tube can be measured by the following method. That is, the height distribution is measured using a contact type or non-contact type shape measuring instrument, and the surface roughness is calculated in accordance with JIS B 0601: 2013.

<Maximum Inclusion Diameter Included in Base Material Portion (Steel Sheet): 300 μm or Less>

As a result of studies, the present inventors found that, even when the bead cut depth and the surface roughness on the inner surface side, which have been described above, are controlled within predetermined ranges, as shown in FIG. 4, in a case where the maximum inclusion diameter that is included in the base material portion 2 becomes large, the fatigue strength decreases. Therefore, in order to improve the fatigue strength of the electric resistance-welded steel tube, it is necessary to suppress not only fatigue fracture originated from the surface but also fatigue fracture originated from an inclusion that is present inside the steel sheet that is used for the steel tube.

In the electric resistance-welded steel tube 1 according to the present embodiment, the maximum inclusion diameter that is included in the base material portion 2 is set to 300 μm or less. When the maximum inclusion diameter exceeds 300 fatigue cracks are initiated and propagate at an early stage, and the fatigue strength decreases, and the steel tube does not stably withstand 80,000 times of the repetition, which is a reference value of the fatigue strength in the present embodiment, after quenching and tempering. The maximum inclusion diameter is preferably 100 μm or less.

The maximum inclusion diameter that is included in the base material portion 2 can be measured by the following method.

That is, a cross section of the steel tube is observed with an optical microscope and a SEM at 45° pitches, the area of the found maximum inclusion is measured, and the diameter of a circle having the same area as the measured maximum inclusion area is regarded as the maximum inclusion diameter.

<Maximum Hardness of Electric Resistance-Welded Steel Tube Including Weld Portion: 300 Hv or Less>

In the case of being used as, for example, a hollow stabilizer, the electric resistance-welded steel tube is subjected to cold working or a heat treatment. Therefore, the cold workability is also important.

When the hardness in the weld portion 3 or the like becomes excessively high, there is a case where cracks are initiated during processing. Therefore, in the electric resistance-welded steel tube 1 according to the present embodiment, the maximum hardness in the weld portion 3 and the base material portion 2 is set to 300 Hv or less.

On the other hand, when the hardness in the weld portion 3 is too low, there is a case where the fatigue strength decreases or tube drawing becomes poor. Therefore, the maximum hardness of the weld portion 3 is preferably equal to or higher than the hardness of the base material portion 2.

The maximum hardness in the weld portion 3 can be controlled by performing a heat treatment such as normalizing after welding.

The maximum hardness in the weld portion 3 and the base material portion 2 can be measured by the following method. That is, the hardness of the weld portion 3 is measured at 0.5 mm pitches within a horizontal range of ±2.5 mm from the welded butt portion. In addition, the hardness of the base material portion 2 is measured at each of a ¼ wall thickness, a ½ wall thickness, and a ¾ wall thickness in the wall thickness direction at 90°, 180°, and 270° positions clockwise from the weld portion (electric resistance weld portion) 3. The hardness (Vickers hardness) is measured in accordance with JIS Z 2244: 2009, and the measurement load is set to 1 kgf or less.

In the electric resistance-welded steel tube 1 according to the present embodiment, the metallographic structure of the base material portion 2 is not limited, but the metallographic structure preferably includes 40% to 60% of ferrite and 60% to 40% of pearlite in terms of the area ratio in order to satisfy characteristics at the time of ordinarily using the steel tube as a hollow stabilizer and appropriate hardness at which poor tube drawing does not occur.

The area ratio in the metallographic structure of the base material portion 2 can be measured by the following method. That is, Nital etching is performed on a cross section of the steel tube to identify ferrite and pearlite, the images of the metallographic structures of the inner surface and the outer surface at 90°, 180°, and 270° positions clockwise from the electric resistance weld portion as 0° are captured with an optical microscope at a magnification of 100 times, and the fractions of ferrite and pearlite in the metallographic structure are obtained. The area ratios measured at the individual positions are averaged and regarded as the area ratio in the metallographic structure of the base material portion 2.

Next, a hollow stabilizer according to the present embodiment will be described.

The hollow stabilizer according to the present embodiment can be obtained by drawing and thermally treating the above-described electric resistance-welded steel tube for a hollow stabilizer according to the present embodiment as necessary, processing the steel tube into a hollow stabilizer shape, and then quenching and tempering the steel tube.

Therefore, the hollow stabilizer according to the present embodiment includes the base material portion and the weld portion.

In the hollow stabilizer according to the present embodiment, with an assumption of the shape of a stabilizer for which the hollow stabilizer is to be used, the wall thickness of the base material portion is 2.0 to 6.0 mm, and the outer diameter of the base material portion is 10 to 40 mm.

Figure 5:
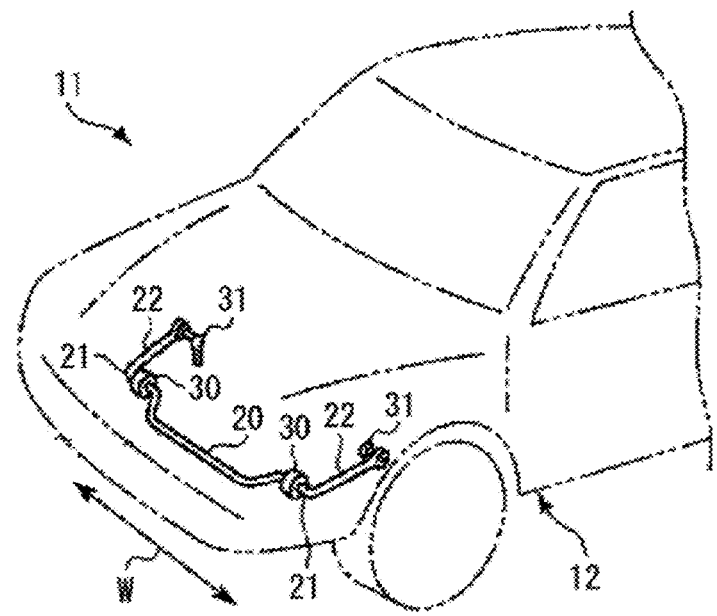
FIG. 5 is a schematic diagram showing an example of a hollow stabilizer according to the present embodiment.

The hollow stabilizer has, for example, a shape as shown in FIG. 5. In FIG. 5, a hollow stabilizer is disposed in a suspension mechanism portion of a vehicle 11. This hollow stabilizer includes a torsion portion 20 extending in the width direction of a vehicle body 12, a pair of bent portions 21 connected to both ends of the torsion portion 20, and a pair of arm portions 22 each connected to the bent portion 21. The torsion portion 20 is supported by, for example, a part of the vehicle body 12 via a pair of support portions 30 including a rubber bush or the like. The pair of arm portions 22 are each connected to, for example, a suspension arm (not shown) of the suspension mechanism portion via a connecting member 31 such as a stabilizer link.

<Chemical Components

The hollow stabilizer according to the present embodiment can be obtained as described above by drawing and thermally treating the electric resistance-welded steel tube for a hollow stabilizer according to the present embodiment as necessary, processing the steel tube into a hollow stabilizer shape, and then quenching and tempering the steel tube. In these steps, since chemical components do not substantially change, the scope and limiting reasons of the chemical composition of the base material portion of the hollow stabilizer according to the present embodiment are the same as the scope and limiting reasons of the chemical composition of the base material portion of the electric resistance-welded steel tube according to the present embodiment.

<Maximum Depth to Bottom of Recessed Part being 300 μM or Less and Preferably 100 μM or Less>

As described above, in an electric resistance-welded steel tube, usually, a recessed bead cut formed by cutting a weld bead with a cutting jig or the like is present in a region including the weld portion on the inner surface side. Therefore, on the inner surface side of a hollow stabilizer processed into a stabilizer shape with drawing or without drawing the electric resistance-welded steel tube, there is a case where a recessed part attributed to the bead cut is present or a recessed part that is formed by the slitting of the bead cut accompanied by the extension of the tube is present. These recessed parts decrease the fatigue strength of the hollow stabilizer.

Since the hollow stabilizer according to the present embodiment is manufactured using an electric resistance-welded steel tube having a bead cut with a small maximum depth, the depth of the recessed part attributed to the bead cut is small, and the slitting of the bead cut is suppressed. Therefore, the maximum depth of the recessed part is small.

Specifically, at the time of viewing the hollow stabilizer according to the present embodiment in a cross section in a direction perpendicular to the central axis direction of a hollow portion (C direction cross section), when an imaginary line is drawn from one end portion to the other end portion on the inner surface side of the weld portion in the shortest distance in a region including the weld portion on the inner surface side of the hollow portion of the hollow stabilizer, the maximum depth from the imaginary line to the bottom of the recessed part is 300 μm or less. The maximum depth is preferably 100 μm or less.

In the hollow stabilizer according to the present embodiment, since the maximum depth is 300 μm or less, the fatigue strength is excellent.

The depth of the above-described recessed part is measured by measuring the maximum wall thickness beside the recessed part and the wall thickness of the recessed part and subtracting the wall thickness of the thinnest portion of the recessed part from the maximum wall thickness. The wall thickness may be measured with, for example, a micrometer.

<Surface Roughness on Inner Surface Side in Base Material Portion: 300 μm or Less and Preferably 100 μm or Less in Terms of Maximum Profile Valley Depth Rv>

When the shape of the above-described recessed part of the weld portion is controlled, since it is possible to suppress fracture occurring in a case where a repeated load is applied such as fatigue fracture originated from the weld portion on the inner surface of the hollow portion of the hollow stabilizer, the fatigue strength improves. However, since fatigue fracture is also initiated from a portion other than the weld portion, only the control of the shape of the weld portion does not sufficiently improve the fatigue strength.

Therefore, in the hollow stabilizer according to the present embodiment, the surface roughness on the inner surface side of the hollow portion of the hollow stabilizer is set to 300 μm or less in terms of the maximum profile valley depth Rv specified in JIS B 0601: 2013. When the maximum profile valley depth Rv of the surface on the inner surface side (inside surface) exceeds 300 fatigue cracks are initiated and propagate at an early stage, which decreases the fatigue strength. The maximum profile valley depth Rv of the surface is preferably 100 μm or less.

A maximum profile valley depth Rv as described above can be obtained by appropriately drawing the tube in the case of drawing the tube using an electric resistance-welded steel tube having a maximum profile valley depth on the inner surface side of 300 μm or less.

Regarding the above-described surface roughness on the inner surface side of the hollow portion, the height distribution is measured using a contact type or non-contact type shape measuring instrument, and the surface roughness is calculated in accordance with JIS B 0601: 2013.

<Maximum Inclusion Diameter Included in Base Material Portion: 300 μm or Less>

Even when the depth of the recessed part of the weld portion and the surface roughness on the inner surface side of the hollow portion, which have been described above, are controlled within predetermined ranges, in a case where the maximum inclusion diameter that is included in the base material portion is large, the fatigue strength decreases. Therefore, in the hollow stabilizer according to the present embodiment, the maximum inclusion diameter that is included in the base material portion is set to 300 μm or less. When the maximum inclusion diameter exceeds 300 μm, fatigue cracks are initiated and propagate at an early stage, and the fatigue strength decreases. The maximum inclusion diameter is preferably 100 μm or less.

In order to set the maximum inclusion diameter of the hollow stabilizer within the above-described range, an electric resistance-welded steel tube in which the maximum inclusion diameter that is included in the base material portion (steel sheet) is 300 μm or less may be used as a material.

The maximum inclusion diameter that is included in the base material portion can be measured by the following method.

That is, a cross section of the steel tube is observed with an optical microscope and a SEM at 45° pitches, the area of the found maximum inclusion is measured, and the diameter of a circle having the same area as the measured maximum inclusion area is regarded as the maximum inclusion diameter.

<Surface Hardness: 455 Hv or More>

In the hollow stabilizer according to the present embodiment, the surface hardness is 455 Hv or more. When the surface hardness is less than 455 Hv, the fatigue strength decreases. The upper limit of the surface hardness is not particularly limited.

Figure 6:
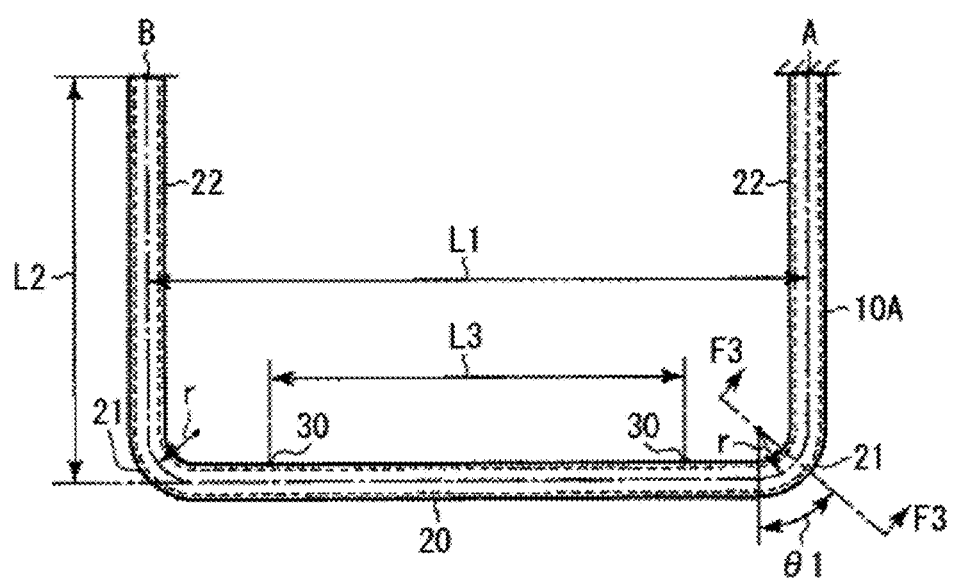
FIG. 6 is a schematic diagram showing a shape of a stabilizer at the time of performing a fatigue test.

Regarding the surface hardness (Vickers hardness), for example, the surface hardness is measured at eight points shifted by 45° in each in the circumferential direction of the bent portion (shoulder portion) 21 of the hollow stabilizer in FIG. 6, and the average hardness thereof is calculated. The measurement conditions at that time are in accordance with JIS-Z 2244: 2009, and the measurement load is set to 1 kgf or less.

Next, a preferred manufacturing method of the electric resistance-welded steel tube 1 according to the present embodiment will be described.

The electric resistance-welded steel tube 1 according to the present embodiment is capable of obtaining the effect regardless of the manufacturing method as long as the electric resistance-welded steel tube 1 has the above-described configuration. However, the following method is preferable because the electric resistance-welded steel tube 1 can be stably manufactured.

In the manufacturing method of an electric resistance-welded steel tube according to the present embodiment, first, a steel piece having a predetermined chemical composition is heated, hot-rolled, and coiled. At that time, it is preferable to set the heating temperature to 1000° C. or higher and the coiling temperature to 800° C. or lower. When the heating temperature is lower than 1000° C., rolling itself becomes difficult. In addition, when the coiling temperature exceeds 800° C., since a large amount of scale remains, the steel sheet is likely to be scratched in tube manufacturing steps that are subsequently performed. In addition, regarding a pickling of the scale, it becomes necessary to control the treatment conditions as strictly as or more strictly than the conditions for thin scale.

After the hot rolling, pickling may be performed or the steel sheet may be left as hot-rolled without performing pickling. However, in the case of performing tube manufacturing described below on the steel sheet as hot-rolled, it is preferable to appropriately select the shape and the like of a group of forming rolls. In addition, when the pickling is not appropriately performed according to the state of the scale under the rolling conditions (an inhibitor or the like is not appropriately selected), there is a concern that the surface roughness on the inner surface side of the base material portion 2 of the electric resistance-welded steel tube 1 may exceed 300 μm in terms of Rv.

Next, the steel sheet obtained by the hot rolling is formed into a tube shape with a group of forming rolls while running the steel sheet to produce an open tube, both end portions of the steel sheet, which has been produced as an open tube, in the sheet width direction that have been butted to each other are melted by heating such as induction heating, and both end portions of the steel sheet in the sheet width direction are welded together by pressing both end portions in a molten state with a pair of squeeze rolls, thereby forming an electric resistance weld portion. The conditions in this case are not limited and may be conditions that are usually performed.

A bead cutting is performed with respect to the electric resistance-welded steel tube obtained by electric resistance welding. Bead cutting is important. In the bead cutting, a tool shape and a cutting position are selected and the inner surface bead is cut such that at least a bead raised on the inner surface after the welding is made smooth after the cutting and the bead cut depth reaches a predetermined value or less. A bead on the outer surface side may also be cut.

After the bead cutting, a heat treatment (so-called normalizing treatment) by which the electric resistance-welded steel tube is heated to 800° C. or higher and 1000° C. or lower. This heat treatment makes it possible for the maximum hardness the electric resistance-welded steel tube including the weld portion to be reduced. The heating temperature is desirably the austenite transformation temperature or higher and 800° C. or higher, but does not necessarily need to exceed the transformation temperature as long as the hardness and the microstructure can be controlled. Since a hardened structure formed by welding or the like acts as a cause for the generation of a scratch during cold working, the generation of a scratch attributed to cold working can be suppressed by the above-described heat treatment.

When the heating temperature is lower than 800° C., the hardened structure remains, and the cold workability deteriorates. Therefore, the heating temperature is preferably set to 800° C. or higher. On the other hand, when the heating temperature exceeds 1000° C., the structure turns into coarse austenite (γ) grains, and a hardened structure, a carbide, or the like is formed. In this case, the workability deteriorates. Therefore, the heating temperature is preferably set to 1000° C. or lower. The heating temperature is more preferably 950° C. or lower.

Regarding the cooling rate after the heating, it is natural cooling in order to form a ferrite and pearlite structure. In the case of performing natural cooling, the average cooling rate from 800° C. to 500° C. is preferably 3° C./s or slower.

The electric resistance-welded steel tube 1 according to the present embodiment can be obtained by the above-described manufacturing method. Furthermore, the electric resistance-welded steel tube 1 according to the present embodiment is made into a hollow stabilizer by as necessary, drawing the steel tube, rolling the steel tube to a reduced diameter, and forming the steel tube as it is, after drawing, or after rolling, by cold working such as bending or pressing, and performing a heat treatment (quenching and tempering or the like) thereon.

The hollow stabilizer according to the present embodiment can be obtained by a manufacturing method including the following steps using the electric resistance-welded steel tube according to the present embodiment as a material.

(I) A processing step of processing the electric resistance-welded steel tube into a hollow stabilizer shape (II) A quenching step of heating the electric resistance-welded steel tube after the processing step to 900° C. to 1200° C. and then cooling the steel tube at a cooling rate of 30° C./s or faster, and (III) A tempering step of heating the electric resistance-welded steel tube after the quenching step to 200° C. to 350° C.

If necessary, the following steps may be further performed before the processing step.

(IV) A tube drawing step of drawing the electric resistance-welded steel tube and (V) A heat treatment step of heating the electric resistance-welded steel tube after the tube drawing step to 800° C. to 1000° C.

(Tube Drawing Step)

As necessary, the electric resistance-welded steel tube is drawn based on the target stabilizer shape. For example, the tube drawing is performed at a reduction of area (a value obtained by dividing the difference between the cross-sectional area before the tube drawing and the cross-sectional area after the tube drawing by the cross-sectional area before the tube drawing×100) within a range of 10% to 40%.

(Heat Treatment Step)

The workability of the electric resistance-welded steel tube that has been drawn deteriorates. Therefore, a heat treatment may be performed in order to ensure the workability in processing steps that are subsequently performed.

In the case of performing the heat treatment, it is preferable to heat the electric resistance-welded steel tube after the tube drawing step to 800° C. to 1000° C. and cool the steel tube in the air.

(Processing Step)

In the processing step, the electric resistance-welded steel tube is processed into a hollow stabilizer shape. The processing is not limited as long as the target shape can be obtained and may be, for example, any of hot working, warm working, and cold working.

(Quenching Step)
(Tempering Step)

In the quenching step and a tempering step, the electric resistance-welded steel tube having the hollow stabilizer shape after the processing step is heated to 900° C. to 1200° C., then, cooled at a cooling rate of 30° C./s or faster (quenched), heated to 200° C. to 400° C., and cooled by water cooling or air cooling (tempered). The structure or the surface hardness can be controlled by controlling the quenching temperature, the cooling rate, and the tempering temperature.

EXAMPLES

Example 1

Slabs having a chemical composition (mass %, remainder: Fe and an impurities) shown in Table 1 were heated to 1000° C. or higher, hot-rolled, coiled at a temperature of 800° C. or lower, and pickled to produce hot rolled steel sheets. These hot rolled steel sheets were formed into a steel tube shape and welded by electric resistance welding, thereby obtaining steel tubes 1 to 19, X, and Y.

TABLE 1

| Classification | Steel type | C | Si | Mn | Al | Ti | B | Cr | Mo | Ca | Cu | N |
|---|---|---|---|---|---|---|---|---|---|---|---|---|
| Present Invention | A | 0.32 | 0.23 | 1.26 | 0.025 | 0.039 | 0.0035 | 0.15 | 0.15 | 0.0035 | 0.10 | 0.0036 |
| Present Invention | B | 0.36 | 0.25 | 1.32 | 0.041 | 0.029 | 0.0029 | 0.14 | 0.10 | 0.0023 | | 0.0022 |
| Present Invention | C | 0.33 | 0.18 | 1.22 | 0.042 | 0.024 | 0.0022 | 0.23 | 0.13 | 0.0019 | | 0.0029 |
| Present Invention | D | 0.35 | 0.23 | 1.29 | 0.037 | 0.028 | 0.0025 | 0.12 | 0.07 | 0.0019 | | 0.0044 |
| Present Invention | E | 0.35 | 0.23 | 1.25 | 0.029 | 0.027 | 0.0024 | 0.13 | 0.07 | 0.0017 | 0.02 | 0.0034 |
| Present Invention | F | 0.34 | 0.28 | 1.33 | 0.023 | 0.022 | 0.0015 | 0.11 | 0.17 | 0.0025 | | 0.0019 |
| Present Invention | G | 0.34 | 0.23 | 1.45 | 0.033 | 0.028 | 0.0012 | 0.16 | 0.09 | 0.0015 | | 0.0029 |
| Present Invention | H | 0.34 | 0.24 | 1.28 | 0.028 | 0.029 | 0.0015 | 0.19 | 0.04 | 0.0048 | | 0.0030 |
| Present Invention | I | 0.34 | 0.26 | 1.35 | 0.039 | 0.028 | 0.0024 | 0.16 | 0.10 | 0.0040 | 0.15 | 0.0028 |
| Present Invention | J | 0.38 | 0.22 | 1.40 | 0.025 | 0.028 | 0.0012 | 0.21 | 0.12 | 0.0035 | | 0.0030 |
| Comparative Example | K | 0.35 | 0.23 | 1.26 | 0.037 | 0.032 | 0.0025 | 0.17 | 0.08 | 0.0000 | | 0.0035 |
| Comparative Example | L | 0.35 | 0.22 | 1.25 | 0.041 | 0.025 | 0.0022 | 0.15 | 0.10 | 0.0015 | | 0.0041 |
| Comparative Example | M | 0.34 | 0.24 | 1.24 | 0.043 | 0.033 | 0.0031 | 0.13 | 0.09 | 0.0008 | | 0.0026 |
| Comparative Example | N | 0.34 | 0.24 | 1.62 | 0.043 | 0.033 | 0.0031 | 0.13 | 0.09 | 0.0018 | | 0.0026 |
| Comparative Example | O | 0.37 | 0.24 | 1.29 | 0.029 | 0.037 | 0.0005 | 0.13 | 0.06 | 0.0019 | | 0.0043 |

| Classification | Steel type | P | S | O | Ni | V | ESSP | Pcm | Larger than 300 μm inclusion |
|---|---|---|---|---|---|---|---|---|---|
| Present Invention | A | 0.010 | 0.0020 | 0.0030 | 0.19 | | 0.88 | 0.43 | Absent |
| Present Invention | B | 0.012 | 0.0025 | 0.0014 | | | 0.61 | 0.46 | Absent |
| Present Invention | C | 0.011 | 0.0019 | 0.0012 | | | 0.68 | 0.43 | Absent |
| Present Invention | D | 0.011 | 0.0017 | 0.0012 | | | 0.76 | 0.45 | Absent |
| Present Invention | E | 0.008 | 0.0019 | 0.0013 | | | 0.60 | 0.45 | Absent |

TABLE 1-continued

| | | | | | | | | |
|---|---|---|---|---|---|---|---|---|
| Present Invention | F | 0.018 | 0.0020 | 0.0012 | | 0.85 | 0.44 | Absent |
| Present Invention | G | 0.012 | 0.0021 | 0.0019 | 0.01 | 0.44 | 0.44 | Absent |
| Present Invention | H | 0.012 | 0.0061 | 0.0025 | | 0.43 | 0.43 | Absent |
| Present Invention | I | 0.015 | 0.0034 | 0.0045 | | 0.42 | 0.45 | Absent |
| Present Invention | J | 0.012 | 0.0023 | 0.0023 | | 0.87 | 0.48 | Absent |
| Comparative Example | K | 0.012 | 0.0030 | 0.0026 | | 0.00 | 0.45 | Present |
| Comparative Example | L | 0.011 | 0.0120 | 0.0015 | | 0.08 | 0.45 | Present |
| Comparative Example | M | 0.010 | 0.0028 | 0.0035 | | 0.13 | 0.44 | Present |
| Comparative Example | N | 0.010 | 0.0021 | 0.0029 | | 0.44 | 0.46 | Present |
| Comparative Example | O | 0.009 | 0.0019 | 0.0014 | | 0.66 | 0.45 | Absent |

Bead cutting was performed on the inner surface sides of the steel tubes. The bead cutting was performed while controlling the bead cut depth in a C direction cross section to be 300 μm or less except the steel tubes 18 and Y. In addition, although the surface roughness Rv was 300 μm or less in all of the steel tubes, in the steel tube 19, the surface roughness Rv was made to exceed 300 μm by shot blasting.

Heat treatments were performed on the electric resistance-welded steel tubes after the bead cutting at a heat treatment temperature and cooling conditions shown in Table 2.

The maximum hardness was measured and the metallographic structures was observed by the above-described methods on the electric resistance-welded steel tubes after the heat treatments. The results are shown in Table 2. Except the steel tubes 11 to 14, the maximum inclusion diameters were 300 μm or less.

The fatigue strengths were evaluated under the following conditions in order to check whether or not the electric resistance-welded steel tubes were suitable for stabilizers.

The electric resistance-welded steel tubes 1 to 19 having an outer diameter of 34 mm and a wall thickness of 5.5 mm were drawn, quenched, and tempered to produce electric resistance-welded steel tubes having an outer diameter of 24 mm and a wall thickness of 4.9 mm. The tube drawing is performed at a reduction of area of 40%. After that, the cold workability was evaluated by estimating scratches or the like on the surfaces. However, the steel tube X and the steel tube Y were not drawn. In addition, as quenching and tempering (QT), the steel tubes were quenched after being held at 1000° C. for one hour and tempered within a temperature range of 150° C. to 250° C. for 10 minutes. Since the fatigue strength is affected by the hardness, the tempering temperatures were selected such that the hardness reached 530 to 570 Hv by controlling the tempering temperature.

Fatigue test pieces were collected from the quenched and tempered materials, and torsional fatigue tests were performed. The test method was in accordance with JIS Z 2273: 1978. As the load stress, 350 MPa alternating stress was used and a stress ratio R (minimum stress/maximum stress) was set to −1.

After the test pieces fractured, the origins of fatigue cracks were inspected, and the fracture origins were classified into bead cut slits, inside surface recessed parts, or inclusions. When the origin was the bead cut slit, the depth of the bead cut was measured, when the origin was the inside surface recessed part, the depth of the inside surface recessed part was measured, and, when the origin was the inclusion, the inclusion diameter was measured. Regarding the evaluation of the fatigue strength, when the number of times of repetition (the number of times before fracturing) is 80,000 ($8.0 \times 10^4$ times) or more as a reference value of the present study, the fatigue strength was determined as excellent. When the number of times of repetition was 100,000 or more, the test piece was determined not to fracture, and the test was completed.

Table 2 shows the test results.

TABLE 2

| Steel tube | Classification | Steel material | Heat treatment temperature (° C.) | Cooling condition | Maximum hardness | Ferrite (area %) | Pearlite (area %) | Tube drawing |
|---|---|---|---|---|---|---|---|---|
| 1 | Present Invention | A | 900 | Air cooling | 210 | 60 | 40 | Possible |
| 2 | Present Invention | B | 1000 | Air cooling | 220 | 45 | 55 | Possible |
| 3 | Present Invention | C | 925 | Air cooling | 210 | 50 | 50 | Possible |
| 4 | Present Invention | D | 950 | Air cooling | 210 | 55 | 45 | Possible |
| 5 | Present Invention | E | 875 | Air cooling | 250 | 50 | 50 | Possible |
| 6 | Present Invention | F | 1000 | Air cooling | 230 | 50 | 50 | Possible |
| 7 | Present Invention | G | 900 | Air cooling | 240 | 55 | 45 | Possible |

TABLE 2-continued

| Steel tube | Classification | Heat treatment condition | | | Number of times before fracturing (×10⁴) | Fracture starting point | Length of starting point (μm) | Processing of electric resistance-welded steel tube |
|---|---|---|---|---|---|---|---|---|
| 8 | Present Invention | H | 1000 | Air cooling | 210 | 60 | 40 | Possible |
| 9 | Present Invention | I | 975 | Air cooling | 220 | 50 | 50 | Possible |
| 10 | Present Invention | J | 900 | Air cooling | 260 | 40 | 60 | Possible |
| 11 | Comparative Example | K | 1000 | Air cooling | 240 | 50 | 50 | Possible |
| 12 | Comparative Example | L | 900 | Air cooling | 240 | 50 | 50 | Possible |
| 13 | Comparative Example | M | 900 | Air cooling | 240 | 50 | 50 | Possible |
| 14 | Comparative Example | N | 900 | Air cooling | 240 | 50 | 50 | Possible |
| 15 | Comparative Example | O | 900 | Air cooling | 240 | 50 | 50 | Possible |
| 16 | Comparative Example | G | 600 | Air cooling | 380 | 70 | 10 | Scratches occur |
| 17 | Comparative Example | H | 900 | Water cooling | 600 | 10 | 5 | Impossible |
| 18 | Comparative Example | H | 900 | Air cooling | 240 | 50 | 50 | Possible |
| 19 | Comparative Example | G | 900 | Air cooling | 240 | 55 | 45 | Possible |
| X | Present Invention | B | 1000 | Air cooling | 220 | 60 | 40 | No tube drawing |
| Y | Comparative Example | B | 1000 | Air cooling | 220 | 60 | 40 | No tube drawing |
| 1 | Present Invention | QT | | | >10 | Absent | — | — |
| 2 | Present Invention | QT | | | >10 | Absent | — | — |
| 3 | Present Invention | QT | | | >10 | Absent | — | — |
| 4 | Present Invention | QT | | | >10 | Absent | — | — |
| 5 | Present Invention | QT | | | >10 | Absent | — | — |
| 6 | Present Invention | QT | | | >10 | Absent | — | — |
| 7 | Present Invention | QT | | | >10 | Absent | — | — |
| 8 | Present Invention | QT | | | >10 | Absent | — | — |
| 9 | Present Invention | QT | | | >10 | Absent | — | — |
| 10 | Present Invention | QT | | | >10 | Absent | — | — |
| 11 | Comparative Example | QT | | | 6.0 | Inclusion | 380 | — |
| 12 | Comparative Example | QT | | | 4.5 | Inclusion | 440 | — |
| 13 | Comparative Example | QT | | | 7.0 | Inclusion | 325 | — |
| 14 | Comparative Example | QT | | | 6.2 | Inclusion | 380 | — |
| 15 | Comparative Example | QT | | | 4.6 | Intergranular ferrite | — | — |
| 16 | Comparative Example | — | | | — | — | — | — |
| 17 | Comparative Example | — | | | — | — | — | — |
| 18 | Comparative Example | QT | | | 6.1 | Bead cut bends | 400 | Deep bead cut (400 μm) |
| 19 | Comparative Example | QT | | | 6.0 | Recessed part on inner surface | 400 | Surface ruined by shot blasting (400 μm) |
| X | Present Invention | QT | | | >10 | Absent | — | — |
| Y | Comparative Example | QT | | | 4.6 | Bead cut bends | 440 | Deep bead cut (440 μm) |

As is clear from Table 2, the steel tubes 1 to 10 and X are the present invention steel tubes and were capable of ensuring an excellent fatigue strength in the fatigue tests after the subsequent quenching and tempering. In addition, for the steel tubes 1 to 10, the subsequent tube drawing was possible, and the cold workability was sufficient.

On the other hand, in the steel tubes 11 to 19 and Y, sufficient fatigue strengths were not obtained.

The steel tube 11 did not contain Ca, and it was not possible to control the form of the inclusion, which decreased the fatigue strength.

Since the steel tube 12 had a high S content and the steel tube 14 had a high Mn content, a coarse MnS was generated and the fatigue strengths decreased in both cases.

In the steel tube 13, the range of each chemical component was appropriate, but the ESSP was low, it was not possible to control the form of the inclusion, and the fatigue strength decreased.

In the steel tube 15, since the B content was low, intergranular ferrite was formed during the quenching, and the steel tube was locally softened, fatigue fracture was promoted, and the fatigue strength decreased.

Since the steel tube 16 was not normalized and was tempered (at 600° C.), a carbide was spheroidized, and the maximum hardness of the electric resistance weld portion was high. As a result, scratches were generated on the weld portion during the tube drawing.

In the steel tube 17, since water cooling was performed as the cooling after the heat treatment, a hardened structure was formed. Therefore, on the steel tube 17, tube drawing was not performed.

In the steel tube 18 and the steel tube Y, deep bead cuts were formed after the end of the electric resistance welding. Therefore, deep bead cut slits were generated and acted as an origin of fatigue fracture, which decreased the fatigue strengths.

In the steel tube 19, shot blasting was excessively performed on the inner surface, which ruined the inside surface.

As a result, fatigue fracture was initiated from the recessed part of the inside surface, and the fatigue strength decreased.

Example 2

The steel tube 2, the steel tube 4, the steel tube X, and the steel tube Y of Example 1 before the tube drawing were used, drawn and thermally treated under conditions shown in Table 3, processed into a shape shown in FIG. 6, quenched and tempered under conditions shown in Table 3, thereby producing hollow stabilizers.

TABLE 3

| Stabilizer | Classification | Steep tube used | Reduction of area of drawn tube (%) | Heat treatment heating temperature (° C.) | Quenching temperature (° C.) | Average cooling rate (° C./s) | Tempering temperature (° C.) |
| --- | --- | --- | --- | --- | --- | --- | --- |
| 1 | Present Invention | 4 | 40 | 900 to 1200 | 900 to 1000 | 30 to 50 | 200 to 300 |
| 2 | Present Invention | 4 | 40 | 900 to 1200 | 900 to 1000 | 30 to 50 | 250 to 350 |
| 3 | Present Invention | 4 | 40 | 900 to 1200 | 900 to 1000 | 30 to 50 | 300 to 400 |
| 4 | Comparative Example | 4 | 40 | 900 to 1200 | 900 to 1000 | 30 to 50 | 350 to 450 |
| 5 | Present Invention | 2 | 40 | 900 to 1200 | 900 to 1000 | 30 to 50 | 200 to 300 |
| 6 | Present Invention | X | 0 | 900 to 1200 | 900 to 1000 | 30 to 50 | 200 to 300 |
| 7 | Comparative Example | Y | 0 | 900 to 1200 | 900 to 1000 | 30 to 50 | 200 to 300 |

The surface hardness of the obtained stabilizers 1 to 7 was measured with a Vickers hardness tester. The measurement conditions were as described below.

The surface hardness was measured at eight points shifted by 45° in each in the circumferential direction of a bent portion (shoulder portion) 21 of the hollow stabilizer in FIG. 6, and the average hardness thereof was calculated. The measurement conditions at that time were in accordance with JIS-Z 2244 (2009), and the measurement load was set to 1 kgf or less.

The results are shown in Table 4.

In addition, fatigue tests were performed on the obtained stabilizers 1 to 7, and the numbers of times of repetition (the numbers of times before fracturing) were evaluated. The fatigue tests were performed under the following conditions.

FIG. 6 shows an electric resistance-welded steel tube bent at a central curvature radius of r (50 mm). The length L1 of the torsion portion was 448 mm, the length L2 of the arm portion was 200 mm, and the span L3 between the pair of support portions (rubber bushes) was 293 mm. The fatigue test (alternating test) was performed under conditions that one arm portion was in a state of being fixed to a fixation point A and loads of +2420N and −2420N were applied to a load point B in the other arm portion.

The results are shown in Table 4.

TABLE 4

| Stabilizer | Classification | Surface hardness (Hv) | Number of times before fracturing (times) |
|---|---|---|---|
| 1 | Present Invention | 553 | More than $1 \times 10^6$ times |
| 2 | Present Invention | 497 | More than $5 \times 10^5$ times |
| 3 | Present Invention | 455 | More than $1 \times 10^5$ times |
| 4 | Comparative Example | 440 | Settling occurs before $1 \times 10^5$ times |
| 5 | Present Invention | 550 | More than $1 \times 10^6$ times |
| 6 | Present Invention | 550 | More than $1 \times 10^6$ times |
| 7 | Comparative Example | 550 | Settling occurs before $1 \times 10^5$ times |

As is clear from Table 3 and Table 4, the stabilizers 1 to 3, 5, and 6 withstood a sufficient number of times of repetition. On the other hand, in the stabilizers 4 and 7, settling occurred at an early stage, and the required fatigue strengths were not satisfied.

BRIEF DESCRIPTION OF THE REFERENCE SYMBOLS

1 Electric resistance-welded steel tube
2 Base material portion
3 Weld portion
4 Bead cut
5 Opening edge
10 Imaginary line
d Bead cut depth
11 Vehicle
12 Vehicle body
10A Steel tube
20 Torsion portion
21 Bent portion
22 Arm portion
30 Support portion
31 Connecting member

The invention claimed is:

1. An electric resistance-welded steel tube for a hollow stabilizer comprising:
a base material portion; and
a weld portion,
wherein the base material portion contains, as chemical components, by mass %,
C: 0.30% to 0.38%,
Si: 0.15% to 0.30%,
Mn: 1.20% to 1.50%,
Al: 0.020% to 0.060%,
Ti: 0.020% to 0.050%,
B: 0.0010% to 0.0050%,
Cr: 0.10% to 0.25%,
Mo: 0% to 0.20%,
Ca: 0.0005% to 0.0050%,
Cu: 0% to 0.25%,
Ni: 0% to 0.25%,
V: 0% to 0.05%,
N: 0.0060% or less,
P: 0.020% or less,
S: 0.0100% or less, and
O: 0.0050% or less,
a remainder includes Fe and impurities,
a wall thickness of the base material portion is 2.0 to 6.0 mm, and an outer diameter of the electric resistance-welded steel tube is 10 to 40 mm,
in a C direction cross section of the electric resistance-welded steel tube,
a recessed bead cut is present in a region including the weld portion on an inner surface side of the electric resistance-welded steel tube,
when an imaginary line is drawn from one opening edge to the other opening edge of the bead cut in a shortest distance, a maximum depth from the imaginary line to a bottom of the bead cut is 300 µm or less,
a maximum inclusion diameter that is included in the base material portion is 300 µm or less,
in the base material portion of the electric resistance-welded steel tube, a surface roughness of the inner surface side is 300 µm or less in terms of a maximum profile valley depth Rv, and
maximum hardness of the electric resistance-welded steel tube including the weld portion is 300 Hv or less.

2. The electric resistance-welded steel tube for a hollow stabilizer according to claim 1,
wherein the chemical components of the base material portion satisfy the following formula (1), $$Ca \times (1 - 124 \times O)/(1.25 \times S) \geq 0.20 \tag{1}$$

3. The electric resistance-welded steel tube for a hollow stabilizer according to claim 1,
wherein the chemical components of the base material portion contain one or more selected from the group consisting of
Cu: 0.05% to 0.25%,
Ni: 0.05% to 0.25%, and
V: 0.01% to 0.05%.

4. The electric resistance-welded steel tube for a hollow stabilizer according to claim 1,
wherein a metallographic structure of the base material portion includes 40% to 60% of ferrite and 60% to 40% of pearlite in terms of an area ratio.

5. A manufacturing method of an electric resistance-welded steel tube for a hollow stabilizer, the method comprising:
performing a heat treatment of heating an electric resistance-welded steel tube formed by electric resistance welding to 800° C. or higher and 1000° C. or lower and then naturally cooling the electric resistance-welded steel tube,
wherein the electric resistance-welded steel tube comprises,
a base material portion; and
a weld portion,
wherein the base material portion contains, as chemical components, by mass %,
C: 0.30% to 0.38%,
Si: 0.15% to 0.30%,
Mn: 1.20% to 1.50%,
Al: 0.020% to 0.060%,
Ti: 0.020% to 0.050%,
B: 0.0010% to 0.0050%,
Cr: 0.10% to 0.25%,
Mo: 0% to 0.20%,
Ca: 0.0005% to 0.0050%,
Cu: 0% to 0.25%,
Ni: 0% to 0.25%,
V: 0% to 0.05%,
N: 0.0060% or less,
P: 0.020% or less,
S: 0.0100% or less, and
O: 0.0050% or less,
a remainder includes Fe and impurities, a wall thickness of the base material portion is 2.0 to 6.0 mm, and an outer diameter of the electric resistance-welded steel tube is 10 to 40 mm, in a C direction cross section of the electric resistance-welded steel tube a recessed bead cut is present in a region including the weld portion on an inner surface side of the electric resistance-welded steel tube, when an imaginary line is drawn from one opening edge to the other opening edge of the bead cut in a shortest distance, a maximum depth from the imaginary line to a bottom of the bead cut is 300 μm or less, a maximum inclusion diameter that is included in the base material portion is 300 μm or less, in the base material portion of the electric resistance-welded steel tube, a surface roughness of the inner surface side is 300 μm or less in terms of a maximum profile valley depth Rv, and maximum hardness of the electric resistance-welded steel tube including the weld portion is 300 Hv or less.

6. A hollow stabilizer comprising:

a base material portion; and a weld portion, wherein the base material portion contains, as chemical components, by mass %, C: 0.30% to 0.38%,
Si: 0.15% to 0.30%,
Mn: 1.20% to 1.50%,
Al: 0.020% to 0.060%,
Ti: 0.020% to 0.050%,
B: 0.0010% to 0.0050%,
Cr: 0.10% to 0.25%,
Mo: 0% to 0.20%,
Ca: 0.0005% to 0.0050%,
Cu: 0% to 0.25%,
Ni: 0% to 0.25%,
V: 0% to 0.05%,
N: 0.0060% or less,
P: 0.020% or less,
S: 0.0100% or less, and
O: 0.0050% or less, a remainder includes Fe and impurities, a wall thickness of the base material portion is 2.0 to 6.0 mm, and an outer diameter of the base material portion is 10 to 40 mm, in a C direction cross section, a recessed part is present in a region including the weld portion on an inner surface side of a hollow portion of the hollow stabilizer, and when an imaginary line is drawn from one end portion to the other end portion on an inner surface side of the weld portion in a shortest distance, a maximum depth from the imaginary line to a bottom of the recessed part is 300 μm or less, a maximum inclusion diameter that is included in the base material portion is 300 μm or less, in the base material portion, a surface roughness of the inner surface side is 300 μm or less in terms of a maximum profile valley depth Rv, and surface hardness is 455 Hv or more.

7. The hollow stabilizer according to claim 6, wherein the chemical components of the base material portion satisfy the following formula (2), $$Ca \times (1-124 \times O)/(1.25 \times S) \geq 0.20 \quad (2).$$

8. The hollow stabilizer according to claim 6, wherein the chemical components of the base material portion contain one or more selected from the group consisting of Cu: 0.05% to 0.25%,
Ni: 0.05% to 0.25%, and
V: 0.01% to 0.05%.

9. A manufacturing method of a hollow stabilizer, comprising:

a tube drawing step of drawing an electric resistance-welded steel tube for a hollow stabilizer;

a heat treatment step of heating the electric resistance-welded steel tube to 800° C. to 1000° C. after the tube drawing step;

a processing step of processing the electric resistance-welded steel tube into a hollow stabilizer shape after the heat treatment step;

a quenching step of heating the electric resistance-welded steel tube to 900° C. to 1200° C. and then cooling the electric resistance-welded steel tube at a cooling rate of 30° C./s or faster after the processing step; and a tempering step of heating the electric resistance-welded steel tube to 200° C. to 400° C. after the quenching step, wherein the hollow stabilizer comprises, a base material portion; and a weld portion, wherein the base material portion contains, as chemical components, by mass %, C: 0.30% to 0.38%,
Si: 0.15% to 0.30%,
Mn: 1.20% to 1.50%,
Al: 0.020% to 0.060%,
Ti: 0.020% to 0.050%,
B: 0.0010% to 0.0050%,
Cr: 0.10% to 0.25%,
Mo: 0% to 0.20%,
Ca: 0.0005% to 0.0050%,
Cu: 0% to 0.25%,
Ni: 0% to 0.25%,
V: 0% to 0.05%,
N: 0.0060% or Less
P: 0.020% or less,
S: 0.0100% or less, and
O: 0.0050% or less, a remainder includes Fe and impurities, a wall thickness of the base material portion is 2.0 to 6.0 mm, and an outer diameter of the base material portion is 10 to 40 mm, in a C direction cross section, a recessed part is present in a region including the weld portion on an inner surface side of a hollow portion of the hollow stabilizer, and when an imaginary line is drawn from one end portion to the other end portion on an inner surface side of the weld portion in a shortest distance, a maximum depth from the imaginary line to a bottom of the recessed part is 300 μm or less, a maximum inclusion diameter that is included in the base material portion is 300 μm or less, in the base material portion, a surface roughness of the inner surface side is 300 μm or less in terms of a maximum profile valley depth Rv, and surface hardness is 455 Hv or more.

10. A manufacturing method of a hollow stabilizer, comprising:
- a processing step of processing an electric resistance-welded steel tube into a hollow stabilizer shape;
- a quenching step of heating the electric resistance-welded steel tube to 900° C. to 1200° C. after the processing step and then cooling the electric resistance-welded steel tube at a cooling rate of 30° C./s or faster; and
- a tempering step of heating the electric resistance-welded steel tube to 200° C. to 400° C. after the quenching step, wherein the hollow stabilizer comprises,
a base material portion; and
a weld portion,
wherein the base material portion contains, as chemical components, by mass %,
C: 0.30% to 0.38%,
Si: 0.15% to 0.30%,
Mn: 1.20% to 1.50%,
Al: 0.020% to 0.060%,
Ti: 0.020% to 0.050%,
B: 0.0010% to 0.0050%,
Cr: 0.10% to 0.25%,
Mo: 0% to 0.20%,
Ca: 0.0005% to 0.0050%,
Cu: 0% to 0.25%,
Ni: 0% to 0.25%,
V: 0% to 0.05%,
N: 0.0060% or less,
P: 0.020% or less,
S: 0.0100% or less, and
O: 0.0050% or less,
a remainder includes Fe and impurities,
a wall thickness of the base material portion is 2.0 to 6.0 mm, and an outer diameter of the base material portion is 10 to 40 mm,
in a C direction cross section,
a recessed part is present in a region including the weld portion on an inner surface side of a hollow portion of the hollow stabilizer, and
when an imaginary line is drawn from one end portion to the other end portion on an inner surface side of the weld portion in a shortest distance, a maximum depth from the imaginary line to a bottom of the recessed part is 300 μm or less,
a maximum inclusion diameter that is included in the base material portion is 300 μm or less,
in the base material portion, a surface roughness of the inner surface side is 300 μm or less in terms of a maximum profile valley depth Rv, and
surface hardness is 455 Hv or more.

* * * * *